(12) United States Patent
Harrison et al.

(10) Patent No.: US 6,886,166 B2
(45) Date of Patent: Apr. 26, 2005

(54) MESSAGE PARSING IN MESSAGE PROCESSING SYSTEMS

(75) Inventors: Roy B Harrison, Andover (GB); Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 09/934,464

(22) Filed: Aug. 21, 2001

(65) Prior Publication Data

US 2002/0083210 A1 Jun. 27, 2002

(30) Foreign Application Priority Data

Sep. 20, 2000 (GB) .............................. 0023169

(51) Int. Cl.[7] .............................................. G06F 9/46
(52) U.S. Cl. ...................................................... 719/313
(58) Field of Search ................................. 719/313, 314, 719/310; 709/206, 246; 715/513; 717/100, 143; 707/6, 104.1

(56) References Cited

U.S. PATENT DOCUMENTS

| | | | | | |
|---|---|---|---|---|---|
| 5,095,522 A | * | 3/1992 | Fujita et al. | ................. | 719/316 |
| 5,212,792 A | * | 5/1993 | Gerety et al. | ................ | 717/100 |
| 5,339,421 A | * | 8/1994 | Housel, III | .................. | 719/328 |
| 5,339,434 A | * | 8/1994 | Rusis | .......................... | 709/246 |
| 5,361,353 A | * | 11/1994 | Carr et al. | ................... | 719/313 |
| 5,367,681 A | * | 11/1994 | Foss et al. | .................. | 719/314 |
| 5,511,199 A | * | 4/1996 | Anthias et al. | ............. | 719/315 |
| 5,632,031 A | * | 5/1997 | Velissaropoulos et al. | ........................ | 707/104.1 |
| 5,710,924 A | * | 1/1998 | Ayoub et al. | ................ | 719/313 |

(Continued)

FOREIGN PATENT DOCUMENTS

| | | | |
|---|---|---|---|
| EP | 0434865 A1 | * | 7/1991 |
| GB | 2354850 A | * | 4/2001 |
| WO | WO 97/08616 | * | 3/1997 |

OTHER PUBLICATIONS (no author given), "Accessing elements in the message body", http://publib.boulder.ibm.com/infocenter/wbihelp/index.jsp?topic=/com.ibm.etools.mft.doc/ax99999_.htm&tab=search&searchWrd=message%20or%20parsers&maxHits=52, no date given.*

B. Gage, "WMQI 2.1 Overview", http://www-306.ibm.com/software/integration/mqfamily/integrator/v21/WMQ1 2.pdf, no date given.*

*Primary Examiner*—Sue Lao
(74) *Attorney, Agent, or Firm*—A. Bruce Clay

(57) ABSTRACT

Methods are provided for parsing, in a message parser P1, P2 of a message processing system 1, a plurality of messages comprising respective corresponding sets of data fields arranged in a predetermined format, to extract a corresponding data field from each message. The format is defined by format information which is stored in the system 1 and which indicates a name for each data field in a said set. In response to a handle request, which indicates the name of a required data field, received from a component 2, 3, 6 of the system, the format information is accessed to determine the location of the required data field in a said message. A handle, indicative of this location, is then supplied to the component. In response to subsequent parsing requests, each comprising the handle and a said message, from the component, the required data field is extracted from the message in each parsing request according to the location indicated by the handle. Message parsing apparatus for handling a plurality of different message formats is also provided. The apparatus 4 may include a plurality of message parsers P1, P2, one for each message format, and a parsing manager 6. The parsing manager 6 manages communications between system applications 2, 3 and the parsers P1, P2 to enable different-format message series to be parsed by the appropriate parsers using the improved parsing methods.

32 Claims, 4 Drawing Sheets

U.S. PATENT DOCUMENTS

| | | | | |
|---|---|---|---|---|
| 5,794,239 A | * | 8/1998 | Walster et al. | 707/6 |
| 6,101,556 A | * | 8/2000 | Piskiel et al. | 719/313 |
| 6,134,598 A | * | 10/2000 | Raman | 709/246 |
| 6,507,856 B1 | * | 1/2003 | Chen et al. | 715/513 |
| 6,662,342 B1 | * | 12/2003 | Marcy | 715/513 |
| 6,668,284 B1 | * | 12/2003 | Parkhurst | 719/313 |
| 6,732,153 B1 | * | 5/2004 | Jakobson et al. | 709/206 |
| 2003/0005410 A1 | * | 1/2003 | Harless | 717/114 |

* cited by examiner

MESSAGE PARSING IN MESSAGE PROCESSING SYSTEMS

FIELD OF INVENTION

This invention relates generally to message parsing in message processing systems. Particular embodiments of the invention provide methods and apparatus for parsing messages and message processing systems incorporating same.

BACKGROUND OF INVENTION

In message processing systems such as those utilizing IBM's MQSeries message processing technology, the system uses names to refer to values within messages. Each message comprises a set of data fields, and each data field has a name according to the nature of the particular data item, or "value", which the data field represents. Thus, for example, a message instructing the transfer of funds between two accounts might include three data fields named FROMACCOUNT, TOACCOUNT and AMOUNT, these fields containing values specifying the payer's account number, the payees account number and the monetary amount of the transfer respectively. System applications use these names to identify the particular values required for processing operations. (IBM and MQSeries are trade marks of International Business Machines Corporation).

Parsing is the operation of extracting from a message the value corresponding to a specified name. This is performed by a message parser, typically implemented in software, to which messages are supplied by system applications for parsing. A message is supplied to the parser together with the name of the required data field. The parser identifies and extracts the required field from the message, returning the value so obtained to the requesting application.

The parsing operation itself depends on the message format. When the message is in the form of a string of <name, value> pairs, (e.g. XML (Extensible Markup Language) format), then the parser simply locates the specified name in the message and extracts the corresponding value. For other formats, however, information defining the arrangement of the named data fields in messages is stored in system memory. On receipt of a parsing request, the parser accesses this format information to determine the location of the required data field in the message format. The parser then applies the result of this name lookup step to the received message in order to extract the correct field. The name lookup step is performed for every message to be parsed. Thus, where an application processes multiple messages of the same type in a similar way (such as, for example, and application which processes the AMOUNT value from multiple funds transfer messages as described above in some way), then the parser will be called upon to perform the same lookup step for each message.

In a database system, when an application issues multiple requests involving similar lookup operations, the requests can be preceded by a "PREPARE" statement. In response, the database performs the appropriate lookup operation and returns a handle to the application which is associated in the database with the result of the lookup operation. This handle is supplied by the application as an input parameter with the subsequent requests, thus avoiding the need to re-perform the lookup operation for each request. However, while this technique has been used to advantage in database systems, the technique has not previously been applied in the field of message parsing.

DISCLOSURE OF THE INVENTION

One aspect of the present invention provides a method of parsing, in a message parser of a message processing system, a plurality of messages comprising respective corresponding sets of data fields arranged in a predetermined format, to extract a corresponding data field from each message. The format is defined by format information stored in the system which indicates a name for each data field in said set. The method comprises: in response to a handle request, indicating the name of a required data field, from a component of the system, accessing the format information to determine the location of the required data field in said message, and supplying a handle, indicative of said location, to said component; and in response to subsequent parsing requests, each comprising the handle and said message, from said component, extracting the required data field from the message in each parsing request according to the location indicated by the handle.

Therefore, when a series of messages with corresponding data fields are to be parsed in the same way, the message parser need only perform the name lookup operation once to determine the location of the required data field in the message format. The parser can then extract this field from each of the messages according to the location indicated by the handle which is dispensed by the parser following the look up operation and then included as a parameter of the parsing requests. Since the relatively slow name lookup step need be performed only once, the processing overhead associated with the message parsing operation can be significantly reduced.

The handle dispensed by the message parser may directly or indirectly indicate the location of the required field. For example, after accessing the format information to determine the location of the required field in the message format, the message parser may store location data, defining the location, in a memory of the system. In such embodiments, the handle may comprise data indexing the stored location data, e.g. in the form of a pointer to a structure or index to a table in which the location data is stored. In preferred embodiments, however, the handle itself comprises such location data so that, on receipt of a subsequent parsing request, the parser can determine the location of the required field directly from the handle. The location data itself may take various forms depending, inter alia, upon the message format. For example, for some formats the location data may specify the offset (e.g. in terms of number of bytes, fields, etc.), of the required field within the message. In some cases, e.g. for a C structure format for example, the location data may specify the length of the required field in addition to the offset. The location data can also specify the field type of the required field (e.g. 2-byte integer, 4-byte floating point, string, etc.,) in addition or as an alternative to the field length as appropriate. As a further example, for formats such as a PCF (MQSeries Programmable Command Format) style tagged format where data fields are tagged and the format information stored in the system indicates the tag corresponding to each data field name, the location data may comprise the tag corresponding to the required data field. Many other formats will be apparent to those skilled in the art, and for each format the location data can be any data which conveniently defines the location of a named field in a message such that the parser can use the data to identify the correct field. Of course, whatever the particular parameters, such as offset, tag, etc., used to identify the location of required fields, these parameters may be specified directly in the location data or the location data could be some coded representation of this information.

Simple embodiments can be envisaged where all the messages to be parsed are of the same type, i.e. have the same set of (one or more) named data fields. Here, the handle request supplied to the message parser need only indicate the name of the required data field. In general, however, the parser will need to be able to parse messages of different types, i.e. messages having a variety of different sets of data fields. In such cases, depending on the particular message format and the nature of the stored format information, it may be desirable for the handle request to indicate the message type. For example, where a C structure format is employed, the stored format information may include a C structure for each type of message, defining the layout of fields for that particular message type. In preferred embodiments therefore, where the stored format information defines the message format for a plurality of different types of message, the step of accessing the format information may be performed by the message parser in response to a handle request which indicates both the name of the required data field and the message type for the messages to be parsed, to determine the location of the required data field in a message of that message type.

A second aspect of the present invention provides message parsing apparatus for parsing a plurality of messages, comprising respective corresponding sets of data fields arranged in a predetermined format, in a message processing system, the apparatus comprising: memory for storing format information defining said predetermined format and indicating a name for each data field in a said set; and a message parser responsive to a handle request, indicating the name of a required data field, from a component of the system to access the format information to determine the location of the required data field in said message, and to supply a handle, indicative of said location, to said component; the message parser being further responsive to subsequent parsing requests, each comprising the handle and a message, from said component to extract the required data field from the message in each parsing request according to the location indicated by the handle.

It is to be understood that, in general, where features are described herein with reference to a method embodying the invention, corresponding features may be provided in accordance with apparatus embodying the invention, and vice versa.

A third aspect of the invention provides a message processing system comprising message parsing apparatus as described above and a message processing component for processing said plurality of messages, wherein the message processing component is arranged to generate said handle request and said parsing requests for supply to the message parsing apparatus. The message processing component may be, for example, a client application of the system or a parsing manager as described in more detail below.

A flexible message processing system should be capable of processing messages in a variety of different formats, and to this end a plurality of message parsers may be employed in the system, one for each of the different message formats. A fourth aspect of the present invention provides message parsing apparatus for parsing messages in a message processing system wherein the messages comprise respective sets of data fields and the data fields of each message are arranged in one of a plurality of predetermined formats, the apparatus comprising: memory for storing format information defining said predetermined formats and indicating a name for each data field in a said set; a plurality of message parsers, each adapted for parsing messages having a corresponding one of said formats; and a parsing manager for managing communications between the message parsers and at least one message processing application of the system; wherein each message parser is responsive to a handle request, indicating the name of a required data field, from the parsing manager to access the format information to determine the location of the required data field in a message in the corresponding format for that parser, and to supply a parsing handle, indicative of said location, to the parsing manager, and is further responsive to subsequent parsing requests from the parsing manager, each comprising the parsing handle and a message in said corresponding format, to extract the required data field from the message in each parsing request according to the location indicated by the parsing handle; and wherein the parsing manager is arranged such that, for a series of messages, comprising respective corresponding sets of data fields having the same one of said formats, which are received from said application and from each of which a corresponding data field is required, the parsing manager issues a said handle request to the parser corresponding to that format, and then, for each message, issues a said parsing request to that parser, whereby the required data field is extracted from each message of the series.

Thus, while systems with multiple message parsers could be designed such that applications identify the format of messages and address parsing requests to the appropriate parser, in apparatus embodying the fourth aspect of the invention a parsing manager is provided for managing communications between system applications and the message parsers. In particular, the parsing manager ensures that messages are forwarded to the appropriate parser for the message format, and issues handle requests and parsing requests to the parsers which operate as described above to achieve improved efficiency in the parsing operation. Provision of the parsing manager allows simplification of the system in that applications need not be aware of which parser is being used, and thus do not need to identify message formats. Additional parsers can be added to the system when required to deal with new message formats, without requiring modification of system applications.

Embodiments can be envisaged where the requests for handles, and the use of handles in parsing requests, are employed only between the parsing manager and message parsers, and not between system applications and the parsing manager. In this case, some other mechanism may be employed by an application to enable the parsing manager to identify a series of similar messages from which a corresponding field is required by the application. In preferred embodiments, however, the application issues a handle request indicating the name of the field required from a series of like messages, and the parsing manager returns a manager handle which the application then includes in subsequent parsing requests to the parsing manager. Again, the handle requests issued by an application preferably also include the message type. The particular way in which the parsing manager interacts with the parsers pursuant to the requests from the application, and the way in which manager handles are correlated with parsing handles issued by the parsers, can be varied in different embodiments. Specific examples of the operation of the parsing manager will be described in detail below. In such embodiments, however, applications can simply issue a handle request to the parsing manager, and the parsing manager ensures that a parsing handle is obtained from the appropriate parser and that this parser is used to parse the subsequent messages supplied by the application. The same type of handle request from applications may thus result in different parsers being selected for different message formats, each parser providing a particular form of parsing handle to the parsing manager to indicate field location according to its corresponding format.

Another aspect of the invention provides a message processing system comprising message parsing apparatus embodying the fourth aspect of the invention, and a message processing application arranged to generate the handle request and parsing requests to which the parsing manager is responsive. The parsing manager of apparatus embodying the fourth aspect of the invention may comprise a processor configured by computer program code means to perform the communication management functions described, and a further aspect of the invention provides a computer program element comprising computer program code means for loading in the processor to configure the processor to perform these functions. The invention also provides a computer program element comprising computer program code means which, when loaded in a processor of a message processing system, controls the operation of the message processing system to perform a method embodying the first aspect of the invention.

BRIEF DESCRIPTION OF THE DRAWINGS

Embodiments of the invention will now be described, by way of example, with reference to the accompanying drawings in which.

DETAILED DESCRIPTION OF THE INVENTION

Figure 1:
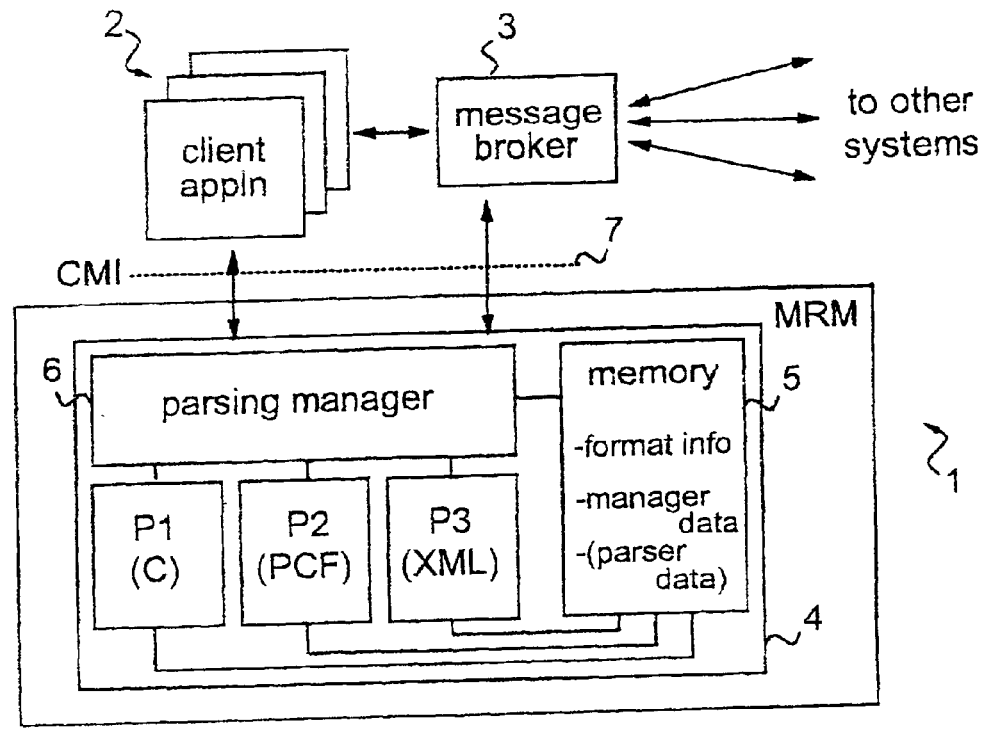
FIG. 1 is schematic block diagram of a message processing system embodying the invention.

FIG. 1 is a schematic illustration of one embodiment of a message processing system, indicated generally at 1, showing the main elements involved in the message parsing processes described below. In this example, the system 1 is an MQSeries system using IBM's MQSeries message processing technology. In the system 1, a number of client applications 2 can communicate with other message processing systems (not shown) by sending and receiving messages via the intermediary of a message broker 3. The message broker 3 (which in practice may form part of IBM's MQSeries Integrator product) can perform various message processing operations on behalf of the system applications 2. For example, where messages are sent to, or received from, another system which utilizes a different message format to the local system 1, the message broker may perform the necessary format conversion. The messages themselves comprise sets of data fields, each data field comprising a data value and being referenced by name in the system as discussed above according to the nature of the particular value which that field represents. The arrangement, or presentation, of the data fields in any given type of message depends on the message format employed, and if system 1 is capable of handling messages in a variety of formats.

The parsing of messages to extract fields required in processing operations of the client applications 2 and broker applications 3 is performed in the system by parsing apparatus indicated generally at 4. In this example, the parsing apparatus 4 forms part of a message repository manager (MRM) in which all the supporting code and information necessary for operation of the applications 2 and 3 is maintained. The parsing apparatus 4 includes a plurality of message parsers, one parser for each of the message formats handled by the system. In the present example there are three message parsers P1, P2 and P3 for parsing messages having C structure, PCF-style and XML formats respectively. In practice, however, there may be any number of parsers according to the number of message formats accommodated by the system. The parsers themselves comprise logic which may be implemented, in general, in hardware or software or a combination thereof. Typically, however, the parsers will be implemented by one or more processors running software which configures the processor(s) to perform the parsing methods described in detail below. Suitable software will be apparent to those skilled in the art from the description herein.

The parsing apparatus 4 also includes a memory 5 and a parsing manager 6 as illustrated. The parsing manager 6 comprises logic for managing communications between the system applications and parsers P1 to P3 as described further below. The applications 2, 3 communicate with the MRM, and hence parsing manager 6, via an interface known as the Common Message Interface (CMI) indicated schematically at 7. Again, the parsing manager logic may be implemented in hardware or software or a combination thereof, but will typically be implemented by a processor running software which configures the processor to perform the functions described and suitable software will be apparent to those skilled in the art from the description herein. (It will be appreciated that the processor(s) implementing the parser and parsing manager logic could be supplied preconfigured with appropriate software, or the program code constituting such software could be supplied separately for loading in the system to configure the processor(s) to operate as described. Such program code could be supplied as an independent element or as an element of the program code for a number of system functions, and may be supplied embodied in a computer-readable medium such as a diskette or an electronic transmission sent to a system operator).

Memory 5 of parsing apparatus 4 stores the usual format information which defines, for the different message formats, the arrangement of the named fields in the various types of message handled by the system. Memory 5 is also used by parsing manager 6 in operation to store manager data pertaining to the parsing management functions described below. In addition, in some embodiments, one or more of the parsers may store parser data in memory 5, the parser data relating to the parsing handles dispensed by the parser in operation as discussed further below. It will of course be appreciated that, while memory 5 is illustrated as a single element in the schematic of FIG. 1, in practice one or more memories may serve collectively as memory 5.

In operation of the system 1, messages to be parsed are supplied by system applications 2, 3 to the parsing manager 6. Parsing manager 6 supplies each message to the appropriate parser P1, P2 or P3 according to the message format, whereupon the required field is extracted by the parser and returned to the application via parsing manager 6. The standard dynamic name interface (value=message.get (name)) operates as usual for a basic parsing operation to extract a particular field from a single message. That is, a requesting application 2, 3 can issue a standard call: message.get(name) to parsing manager 6 via interface 7, where the message to be parsed is supplied in this call together with the name of the required field, and the type and format of the message are indicated in the message header as usual. The parsing manager identifies the message format from the message header, and forwards the call to the corresponding parser which then parses the message in the usual way, accessing the format information if necessary to determine the location of the required field in the message. In operation of applications 2, 3, however, it will often be necessary to extract the same field from a series of messages of the same type (i.e. with corresponding sets of data fields) and the same format. For example, a filter node 'company= "IBM"' will need to extract the field named "company" from every message that passes to that node. In the present system 1, when an application requires the parsing of a series of like messages in this way, the application first issues a handle request to the parsing manager 6. In the embodiments detailed below, this handle request takes the form of the call:

messageType.getHandle("name")

which indicates the message type and the name of the required field. In response, the parsing manager returns a manager handle mh to the application. The application subsequently issues a parsing request to parsing manager 6 for each message in the series to be parsed. In the examples described below the parsing request issued by the application is in the form of the call:

message.getfromHandle(mh)

whereby the message is supplied together with the previously issued manager handle mh. Similar calls are used between the parsing manager and parsers P1 to P3. Thus, for a series of like messages as described above, the parsing manager issues a handle request to a parser P1 to P3, and the parser returns a parsing handle p, i.e.:

p=messageType.getHandle("name")

The parsing manager subsequently supplies a series of parsing requests, here using the parsing handle p, to the parser which then returns the required field value, i.e.:

value=message.getfromHandle(p).

The detailed operation of the parsing manager 6 will be described below, but it is useful first to consider operation of the parsers P1 to P3 in FIG. 1 in response to the calls from the parsing manager.

Figure 2:
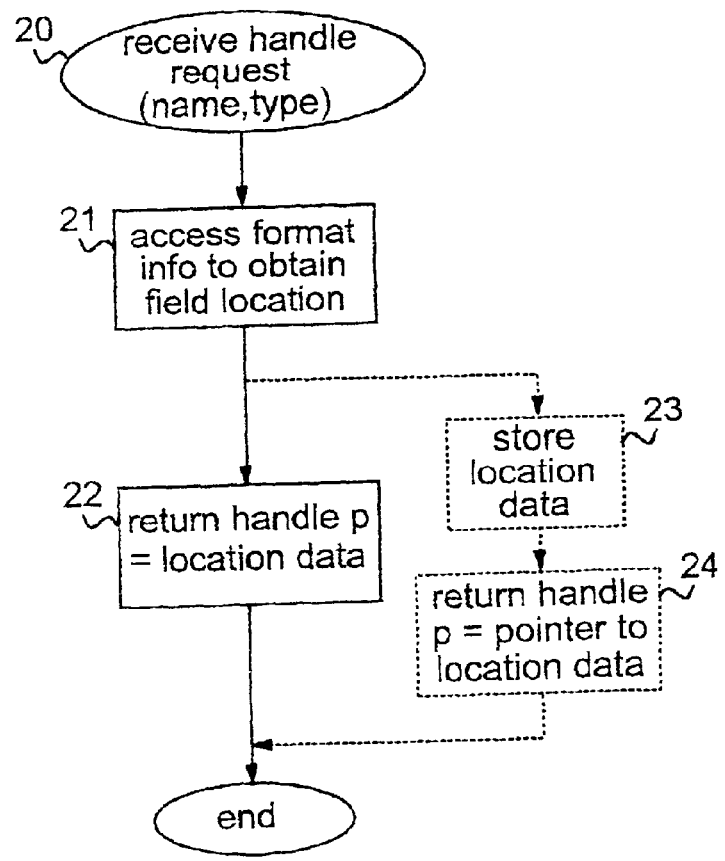
FIG. 2 illustrates the operation of a message parser in response to a handle request in the system of FIG. 1.

FIG. 2 illustrates the operation of the two parsers P1 and P2 in response to a handle request from manager 6. The handle request call, indicating the field name and message type as described above, is received by the parser at step 20. Next, in step 21 the parser accesses the corresponding format information stored in memory 5 to determine the location of the required field in a message of the specified message type. Data defining the field location is then returned to manager 6 as the parsing handle p in step 22, and the process is complete. While step 22 is performed in preferred embodiments, in alternative embodiments step 22 here may be replaced by steps 23 and 24 as indicated by the dotted lines in the figure. Here, data defining the field location determined at step 21 is stored at step 23 as parser data in memory 5. In step 24, the parser then returns a parsing handle p in the form of a pointer to the stored location data in memory 5. In either embodiment, the nature of the location data itself depends on the particular message format handled by the parser, and this will now be addressed in more detail. As mentioned earlier, each message typically includes some form of header, indicating various general information such as message format and message type, plus a set of data fields containing the data values specific to that message. The arrangement of these data fields is determined by the message format adopted. By way of example, an XML format message requesting a funds transfer may include the following string:

<rt><fromacc>12386</fromacc><toacc>729</toacc><amount>200</amount></rt> where:

"rt" indicates the message type as a Request Transfer message;

"fromacc" is the name of the field containing the payer's account number, here 12386;

"toacc" is the name of the field containing the payee's account number, here 729; and "amount" is the name of the field specifying the amount of the transfer, here $200.

Here, therefore, the data fields are arranged in a string of <name, value> pairs with the names of the data fields appearing in the message itself. For the same message in a C structure format, the three data fields "fromacc", "toacc" and "amount" might be arranged simply as successive 4-byte fields containing the numbers 12386, 729 and 200 respectively. The following format information for Request Transfer messages may thus be stored in memory 5 to define the location of each field in this type of message by field name:

```
typedef Struct {
    int fromacc;
    int toacc;
    int amount;
}rt;
```

For the same message in a PCF-style tagged format, the three data fields may be arranged one after the other with a field header for each field, the field header containing a tag corresponding to the field name and a length indicator specifying the length of the field. In this case the format information stored in memory 5 may simply specify the tag corresponding to each field name, whereby the location of a particular named field in a message is defined by association with the corresponding tag.

Thus, reverting to FIG. 2, for the C structure parser P1 the location data (step 22 or 23) may define the field location in terms of the offset and length of the field in the message. For example, assuming step 22 is employed, the parsing handle p returned by P1 for the "amount" field in the above Request Transfer message might be p=8,4 indicating that the field is offset by 8 bytes and is 4 bytes in length. For the PCF parser P2, the location data may simply be the tag used for the "amount" field in the message. Each parser P1, P2 therefore responds to a handle request from manager 6 by returning a parsing handle p indicative of the required field location for the message type indicated in the parsing request. (Note that the message type is included in the handle request to enable parsers to access the stored format information for the appropriate message type in cases, such as the C structure format described above, where separate format information is provided for each message type. Also, while a C structure parser and a PCF parser are described here to illustrate the underlying principles, it will be appreciated that parsers for various other message formats may be employed. The location data obtained from the stored format information in each case may be any convenient data for defining field locations. For many formats, it will be desirable for the location data to define the field type (e.g. 2-byte integer, 4-byte floating point, string, etc.,) determined from the stored format information, in addition to the field length as appropriate. The location data can thus take various forms according to the message format as will be apparent to those skilled in the art).

Considering now the XML parser P3, since field names are specified in the XML message format as described above, any named field can be identified directly from messages and no name lookup step is required. Accordingly, in the present embodiment parser P3 simply responds to the handle request from the parsing manager 6 by returning the field name specified in the handle request, i.e.:

name=messageType.getHandle("name").

Figure 3:
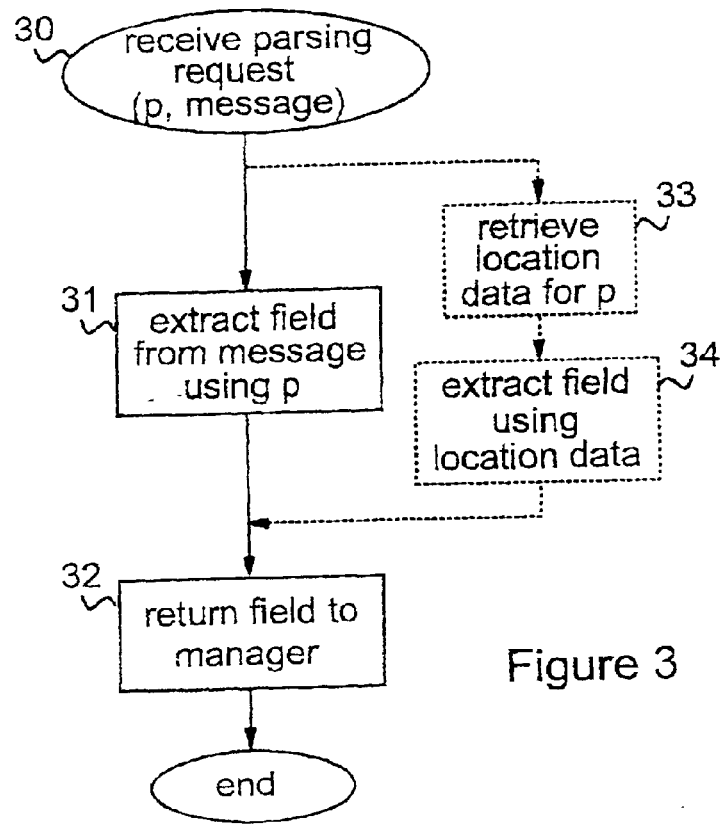
FIG. 3 illustrates the operation of the message parser in response to a parsing request in the system.

FIG. 3 illustrates the operation of parsers P1 and P2 in response to a subsequent parsing request from the parsing manager 6. The parsing request, which includes the message and the parsing handle p as described above, is received by the parser at step 30. For embodiments where the parsing handle comprises the location data itself (i.e. for a parser which implements step 22 of FIG. 2), operation proceeds to step 31 where the parser extracts the field at the location defined by the location data in the handle p. Thus, the C structure parser P1 extracts the field with the offset and length specified by the handle. The PCF parser P2 extracts the field for which the field header includes the tag specified by the handle p. The resulting field is then returned to the manager 6 in step 32 and the process is complete. Steps 33 and 34 shown in dotted lines in FIG. 3 replace step 31 in embodiments which implement steps 23 and 24 in FIG. 2. Here, the parser accesses memory 5 in step 33 to retrieve the location data from the memory location indicated by the handle p. In step 34 the parser then uses the location data to extract the required field from the message as previously described.

The process of FIG. 3 is performed by a parser P1, P2 for each of a series of parsing requests issued by parsing manager 6 where a series of like messages are to be parsed in the same way. Each parsing request includes the parsing handle p issued to the manager 6 following a handle request as described with reference to FIG. 2. The operation of parsers P1 and P2 is thereby optimized in that the name look up step, corresponding to step 21 in FIG. 2, is performed only once for the series of messages, the resulting parsing handle p providing the information necessary to parse each message of the series. For the XML parser P3, no optimization is possible due to the nature of the message format as described above. However, the same call structure can still be used with this parser. Thus, in response to a parsing request message.getFromHandle("name") from manager 6 following a handle request to P3 as described above, the parser P3 simply finds the <name, value> pair for the required field name in the message, returning the value to the manager 6 in the usual way.

Figure 4:
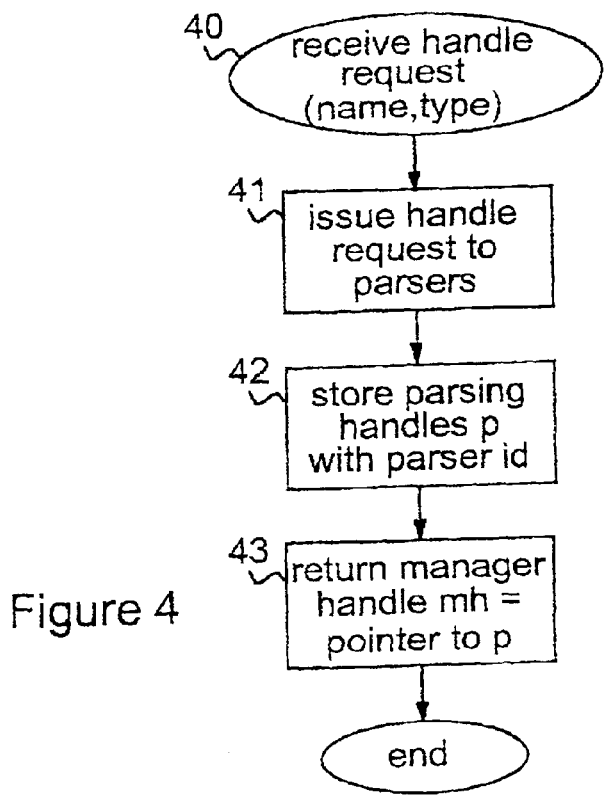
FIG. 4 illustrates operation of a parsing manager in the FIG. 1 system in response to a handle request from a system application in a first embodiment.
Figure 5:
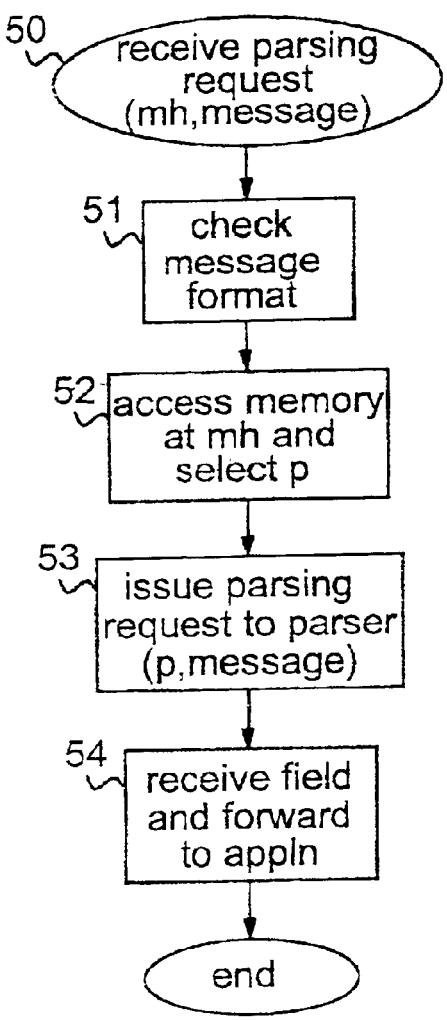
FIG. 5 illustrates operation of the parsing manager in the first embodiment in response to a parsing request from an application.

Operation of the parsing manager 6 in managing communications between the system applications 2, 3 and the parsers P1 to P3 will now be described. The operation of a first embodiment of the parsing manager is illustrated in FIGS. 4 and 5, where FIG. 4 illustrates the operation in response to a handle request from an application, and FIG. 5 illustrates operation in response to a subsequent parsing request. As discussed earlier, when a system application 2, 3 requires the parsing of a series of like messages to extract the same field from each message, the application first issues a handle request to the parsing manager 6. Referring to FIG. 4, the manager receives the handle request, which indicates the message type and required field name as described above, at step 40. In step 41, the manager 6 forwards the handle request to each of the parsers P1 to P3. Each parser then functions as described above to return a parsing handle p to manager 6 (where p="name" for the XML parser P3). On receipt of the parsing handles at step 42, manager 6 stores each handle, together with a parser id identifying the originating parser, as manager data in memory 5. Next, in step 43 the parsing manager issues a manager handle mh to the requesting application, where mh here comprises a pointer to the manager data stored in memory 5 at step 42. Operation is then complete.

For each message of the series to be parsed, the application subsequently issues a parsing request in the form message.getfromHandle(mh), and this is received by manager 6. On receipt of this parsing request as indicated at step 50 of FIG. 5, operation proceeds to step 51 where the manager checks the message format from the message header in the parsing request. Next, in step 52, the manager accesses the manager data in memory 5 at the location of the pointer mh, and selects the parsing handle p issued by the appropriate parser for the message format, as identified by the stored parser id. In step 53, the manager 6 issues a parsing request to this parser using the selected parsing handle as described above. The field extracted by the parser is received at step 54, whereupon the required field is returned to the application. The process is then complete for that particular parsing request from the application, but is repeated for each subsequent parsing request containing a different message of the series.

It will be seen that, in this first embodiment of the parsing manager, parsing handles are obtained from all parsers P1 to P3 in response to a handle request from a system application. These handles are therefore already available in memory when a subsequent parsing request is received, the manager identifying the appropriate parser, and hence the appropriate parsing handle, by checking the message format in the parsing request.

Figure 6:
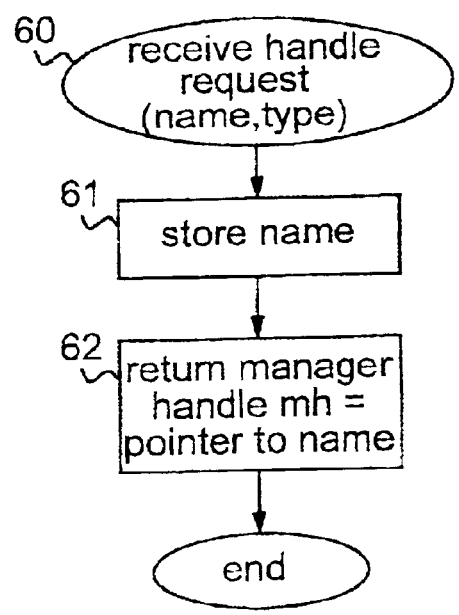
FIG. 6 illustrates operation of a parsing manager in the FIG. 1 system in response to a handle request from an application in a second embodiment.
Figure 7:
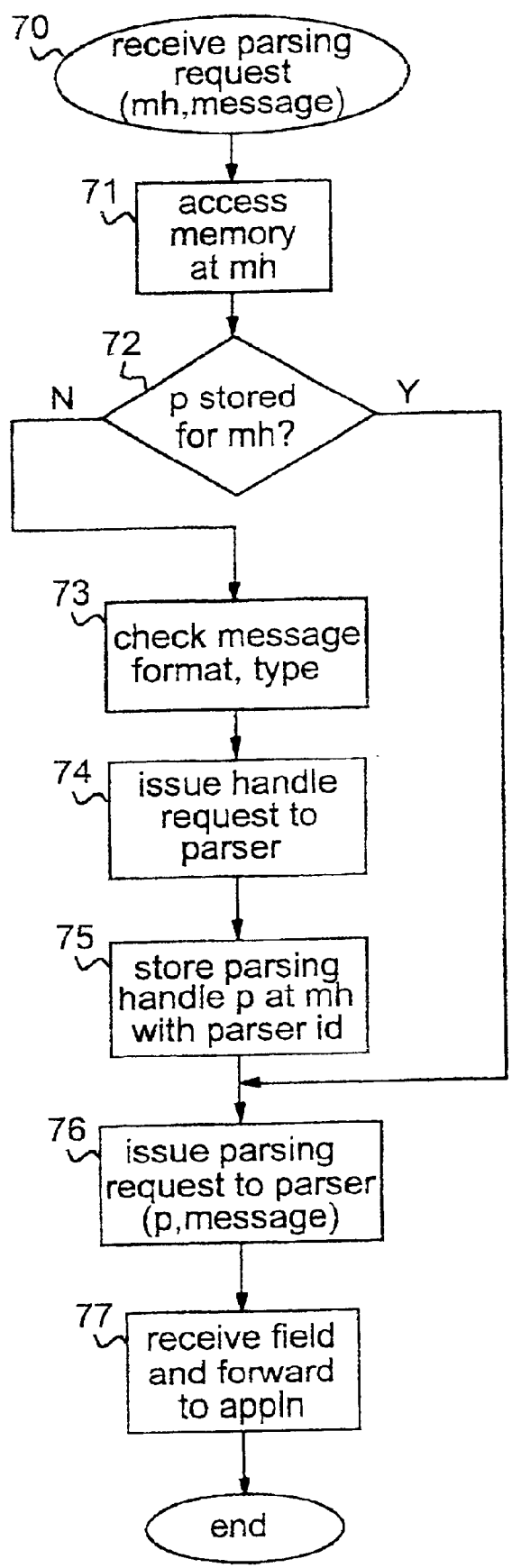
FIG. 7 illustrates operation of the parsing manager in the second embodiment in response to a parsing request from an application.

An alternative embodiment of the parsing manager will be described with reference to FIGS. 6 and 7, where FIG. 6 illustrates the operation in response to a handle request from an application, and FIG. 7 illustrates operation in response to a subsequent parsing request. In this embodiment, the parsing manager receives a handle request from an application at step 60 of FIG. 6. At step 61 the manager stores the name of the required field, as indicated in the handle request, as manager data in memory 5, and then returns a manager handle mh to the application in step 62, where mh here comprises a pointer to the stored name. In response to a subsequent parsing request from the application as indicated at step 70 of FIG. 7, operation proceeds to step 71 where the manager 6 accesses memory 5 at the location indicated by the handle mh in the parsing request. In step 72 the manager then checks whether a parsing handle p has been stored with the field name at mh. For the first parsing request using handle mh the result of step 72 will be "No", whereupon operation proceeds to step 73. Here, the parsing manager checks the message type and format from the message in the received parsing request, and selects the appropriate parser P1, P2 or P3 for the format identified. In step 74 the manager 6 then issues a handle request to the selected parser, specifying the required field name as stored at mh and the message type identified in step 73. In step 75 the parsing handle p returned by the parser is stored with the parser id at location mh in memory 5. Next, in step 76 the parsing manager issues a parsing request to the same parser, the request here including the parsing handle just returned by that parser, together with the message to be parsed. The parser then operates to extract the required field as described above, whereupon the field is received by the parsing manager and forwarded to the application at step 77. Here, therefore, acquisition of a parsing handle p is deferred by manager 6 until receipt of the first parsing request from an application, but a handle is then obtained from the correct parser for the message format and is stored in memory 5 to associate the parsing handle with the manager handle previously issued to the application. For the second and subsequent parsing requests from the application, the stored parsing handle p will be identified at step 72 of FIG. 7. In this case, operation proceeds directly to step 76 where a parsing request is forwarded to the appropriate parser, as identified by the stored parser id, and then continues as before.

To avoid accumulation of obsolete manager data (and parser data where utilized) in memory 5, a "delete handle" call is preferably employed by applications when the last message has been parsed using a particular manager handle mh. In response to this call, the parsing manager accesses the manager data for the handle mh specified in the delete handle call, and retrieves the parsing handle(s) p stored with associated parser id(s) at this location. For the (or each) parsing handle retrieved, manager 6 issues a delete handle call, including that parsing handle, to the appropriate parser, whereupon the parser deletes any parser data associated with that handle which has been stored in memory 5. The delete handle call may be of the form: messageType.deleteHandle (handle), where the message type is included here to provide flexibility in handle allocation, and in particular to allow system components to issue the same handle for different message types if desired.

It will be seen from the above that the code for operation of the embodiments described, as between, firstly, a system application and the parsing manager, and, secondly, the parsing manager and a parser, is essentially split into three calls:

a handle request: handle=messageType.getHandle ("name");

a parsing request: value=message.getFromHandle (handle); and a delete handle call: messageType.deleteHandle(handle) where "handle" is a manager handle mh between system applications and the parsing manager, and a parsing handle p between the parsing manager and parsers P1 to P3 (p simply being a field name for an XML parser P3). The first and last calls are made only once for a given message series, and the second call is repeated for each message. A highly efficient yet flexible message processing system is therefore provided, in which one or more parsers can implement the optimized parsing methods described. Parsers which cannot implement the optimized parsing process, or are not required to do so, can simply operate as the XML parser P3 described above. (As will be appreciated by those skilled in the art, if such a parser is created as a subclass of a standard base class, this behaviour can be implemented as a virtual function in the base class). System applications need not be aware of which parser is being used at any time, and new parsers can be added to the system without requiring modification of applications. Indeed, in the system described, parsers may be dynamically loaded by the parsing manager when required to accommodate particular message formats.

Many alternatives and modifications to the particular embodiments described above can be envisaged. For example, if the parsing request call is modified to include the required field name, then in the embodiment of FIGS. 6 and 7 it would be unnecessary for the parsing manager to store the field name in response to the handle request. The parsing manager could simply dispense a manager handle mh as a pointer to a free memory location in response to the handle request, and then, in step 73 of FIG. 7, obtain the required field name from the received parsing request for use in the handle request at step 74. Also, rather than storing the parser id at step 75 of FIG. 7, the parsing manager could simply check the message format from the message in the received parsing request to identify the appropriate parser for the parsing request issued in step 76. In embodiments where the message format is specified in the handle request from an application, the parsing manager can simply forward the handle request to the corresponding parser, and forward the parsing handle issued by the parser directly to the application. When the application then issues a parsing request using that parsing handle, the message format, and hence the correct parser, can be identified by the parsing manager from the message in the parsing request. Further, if name strings cannot be stored in the datatype chosen for handles, then non-optimized parsers such as the XML parser described above may simply save the name and create the parsing handle as a direction (index, pointer, etc.) to it.

In alternative embodiments of the parsing manager, rather than maintaining stored parsing handles for all parsing operations currently in progress for applications, the parsing manager could operate as described above for the first series of parsing operations for an application. If, while this is in progress, another application issues a call which would require a new parsing handle to be obtained (e.g. from a new parser), then the parsing manager may issue a manager handle but simply revert to the standard call (message.get (name)) to the parser concerned each time a parsing request is subsequently received from that application with the newly issued manager handle. Here, additional parsing handles are not accumulated in memory, but the optimized parser operation is only achieved for the first application which becomes active during any given period. When the delete handle call is received from this first application, manager data can then be stored, and optimized parser operation proceed, for the next activated application, and so on. This may be a preferred embodiment where the maximum number of concurrently active applications is usually very low, or where it is desired to minimize the memory requirements for storage of manager data. Of course, rather than maintaining manager data in this way for the first active application, the parsing manager could maintain manager data, and operate as described above, for only the last active application at any time, reverting to the standard call, and hence non-optimized parser operation, for this application only when a new application becomes active. Alternatively, the parsing manager may store manager data, allowing optimized parser operation, for a predetermined maximum number of active applications, reverting to the standard call for any applications beyond this maximum number. (Note that these embodiments require the parsing request call issued by applications to include the required field name, i.e.: message.getfromHandle(mh, name), for use in the standard calls issued to parsers). It will be apparent to those skilled in the art that many other changes and modifications can be made to the embodiments described without departing from the scope of the invention.

What is claimed is:

1. A method of parsing, in a message parser of a message processing system, a plurality of messages comprising respective corresponding sets of data fields arranged in a predetermined format, to extract a corresponding data field from each message, said format being defined by format information stored in the system which indicates a name for each data field in a said set, the method comprising:

in response to a handle request, indicating the name of a required data field, from a component of the system, accessing the format information to determine the location of the required data field in a said message, and supplying a handle, indicative of said location, to said component; and in response to subsequent parsing requests, each comprising the handle and a said message, from said component, extracting the required data field from the message in each parsing request according to the location indicated by the handle.

2. A method according to claim 1 wherein the handle comprises location data defining said location.

3. A method according to claim 2 wherein the location data defines the offset of the required data field in the message.

4. A method according to claim 3 wherein the location data further defines at least one of the length and field type of the required data field.

5. A method according to claim 2 wherein each data field is tagged in the message format and said format information indicates the respective tags corresponding to the names of the data fields in said set, and wherein said location data comprises the tag corresponding to the required data field.

6. A method according to claim 1 including, in response to the handle request, storing location data defining said location, wherein the handle comprises data indexing the stored location data.

7. A method according to claim 6 wherein the location data defines the offset of the required data field in the message.

8. A method according to claim 7 wherein the location data further defines at least one of the length and field type of the required data field.

9. A method according to claim 6 wherein each data field is tagged in the message format and said format information indicates the respective tags corresponding to the names of the data fields in said set, and wherein said location data comprises the tag corresponding to the required data field.

10. A method according to claim 1 wherein the format information stored in said system defines the message format for a plurality of different types of message corresponding to respective different sets of data fields, and wherein the step of accessing the format information is performed in response to a handle request which indicates the name of the required data field and the message type for the messages to be parsed, to determine the location of the required data field in a message of that message type.

11. Message parsing apparatus for parsing a plurality of messages, comprising respective corresponding sets of data fields arranged in a predetermined format, in a message processing system, the apparatus comprising:

memory for storing format information defining said predetermined format and indicating a name for each data field in a said set; and a message parser responsive to a handle request, indicating the name of a required data field, from a component of the system to access the format information to determine the location of the required data field in a said message, and to supply a handle, indicative of said location, to said component;

the message parser being further responsive to subsequent parsing requests, each comprising the handle and a said message, from said component to extract the required data field from the message in each parsing request according to the location indicated by the handle.

12. Apparatus according to claim 11 wherein the handle comprises location data defining said location.

13. Apparatus according to claim 12 wherein the location data defines the offset of the required data field in the message.

14. Apparatus according to claim 13 wherein the location data further defines at least one of the length and field type of the required data field.

15. Apparatus according to claim 12 wherein each data field is tagged in the message format and said format information indicates the respective tags corresponding to the names of the data fields in said set, and wherein said location data comprises the tag corresponding to the required data field.

16. Apparatus according to claim 11 wherein the message parser is arranged to store location data, defining said location, in the memory, and wherein the handle comprises data indexing the stored location data.

17. Apparatus according to claim 16 wherein the location data defines the offset of the required data field in the message.

18. Apparatus according to claim 17 wherein the location data further defines at least one of the length and field type of the required data field.

19. Apparatus according to claim 16 wherein each data field is tagged in the message format and said format information indicates the respective tags corresponding to the names of the data fields in said set, and wherein said location data comprises the tag corresponding to the required data field.

20. Apparatus according to claim 11 for parsing a plurality of different types of message corresponding to respective different sets of data fields, wherein the format information stored in the memory in use defines the message format for each of said plurality of different message types, and wherein the message parser is arranged to access the format information in response to a handle request which indicates the name of the required data field and the message type for the messages to be parsed, to determine the location of the required data field in a message of that message type.

21. A message processing system comprising:

message parsing apparatus for parsing a plurality of messages which comprise respective corresponding sets of data fields arranged in a predetermined format, the apparatus comprising memory for storing format information defining said predetermined format and indicating a name for each data field in a said set, and a message parser responsive to a handle request, indicating the name of a required data field, from a component of the system to access the format information to determine the location of the required data field in a said message, and to supply a handle, indicative of said location, to said component, the message parser being further responsive to subsequent parsing requests, each comprising the handle and a said message, from said component to extract the required data field from the message in each parsing request according to the location indicated by the handle; and a message processing component for processing said plurality of messages, the message processing component being arranged to generate said handle request and said parsing requests for supply to the message parsing apparatus.

22. Message parsing apparatus for parsing messages in a message processing system wherein the messages comprise respective sets of data fields and the data fields of each message are arranged in one of a plurality of predetermined formats, the apparatus comprising:

memory for storing format information defining said predetermined formats and indicating a name for each data field in a said set;

a plurality of message parsers, each adapted for parsing messages having a corresponding one of said formats; and a parsing manager for managing communications between the message parsers and at least one message processing application of the system;

wherein each message parser is responsive to a handle request, indicating the name of a required data field, from the parsing manager to access the format information to determine the location of the required data field in a message in the corresponding format for that parser, and to supply a parsing handle, indicative of said location, to the parsing manager, and is further responsive to subsequent parsing requests from the parsing manager, each comprising the parsing handle and a message in said corresponding format, to extract the required data field from the message in each parsing request according to the location indicated by the parsing handle;

and wherein the parsing manager is arranged to perform said managing of communications such that, for a series of messages, comprising respective corresponding sets of data fields having the same one of said formats, which are received from said application and from each of which a corresponding data field is required, the parsing manager issues a said handle request to the parser corresponding to that format, and then, for each message, issues a said parsing request to that parser, whereby the required data field is extracted from each message of the series.

23. Apparatus according to claim 22 wherein:

the parsing manager is responsive to a handle request, indicating the name of the required data field, from said message processing application, to supply the handle request to each of the message parsers, to store the parsing handles received from the parsers in the memory, and to supply a manager handle associated with the stored parsing handles to said application; and the parsing manager is further responsive to each of subsequent parsing requests, comprising the manager handle and respective messages of said series of messages, received from the application, to identify the message format from the message in the received parsing request, to select, from the stored parsing handles associated with the manager handle, the parsing handle for the parser corresponding to the identified format, and to supply a parsing request, comprising the selected parsing handle and the message in the received parsing request, to that parser.

24. Apparatus according to claim 22 wherein:

the parsing manager is responsive to a handle request, indicating the name of the required data field, from said message processing application, to supply a manager handle to the application; and the parsing manager is responsive to the first of subsequent parsing requests from the application, each comprising the manager handle and one of said series of messages, to identify the message format from the message in the first parsing request, to supply a handle request to the message parser corresponding to the identified format, to store the parsing handle returned by the corresponding parser in the memory in association with said manager handle, and to supply a parsing request, comprising said parsing handle and the message in said first parsing request, to said corresponding parser; and the parsing manager is responsive to each further one of said subsequent parsing requests received from the application to identify the stored parsing handle associated with the manager handle, and to supply a parsing request, comprising that parsing handle and the message in the received parsing request, to said corresponding parser.

25. Apparatus according to claim 22 wherein the format information stored in the memory in use defines said predetermined formats for each of a plurality of different types of message corresponding to respective different sets of data fields, and wherein each message parser is arranged to access the format information in response to receipt from the parsing manager of a handle request which indicates the name of the required data field and the message type for the messages to be parsed, to determine the location of the required data field in a message of that message type.

26. Apparatus according to claim 23 wherein the parsing manager comprises a processor configured by computer program code means to perform said managing of communications between the message parsers and said message processing application.

27. Apparatus according to claim 24 wherein the parsing manager comprises a processor configured by computer program code means to perform said managing of communications between the message parsers and said message processing application.

28. A message processing system comprising:

message parsing apparatus according to claim 23; and a message processing application for processing said series of messages;

wherein the message processing application is arranged to generate the handle request and parsing requests to which the parsing manager is responsive.

29. A message processing system comprising:

message parsing apparatus according to claim 24; and a message processing application for processing said series of messages;

wherein the message processing application is arranged to generate the handle request and parsing requests to which the parsing manager is responsive.

30. A computer program product comprising a computer usable medium having embodied therein computer readable program code means for causing a processor of a message processing system to perform a method of parsing a plurality of messages, which comprise respective corresponding sets of data fields arranged in a predetermined format, to extract a corresponding data field from each message, said format being defined by format information stored in the system which indicates a name for each data field in a said set, the method comprising the steps of:

in response to a handle request, indicating the name of a required data field, from a component of the system, accessing the format information to determine the location of the required data field in a said message, and supplying a handle, indicative of said location, to said component; and in response to subsequent parsing requests, each comprising the handle and a said message, from said component, extracting the required data field from the message in each parsing request according to the location indicated by the handle.

31. A computer program product comprising a computer usable medium having embodied therein computer readable program code means for loading in said processor of apparatus according to claim 26 to configure the processor to perform said managing of communications.

32. A computer program product comprising a computer usable medium having embodied therein computer readable program code means for loading in said processor of apparatus according to claim 27 to configure the processor to perform said managing of communications.

* * * * *

UNITED STATES PATENT AND TRADEMARK OFFICE
CERTIFICATE OF CORRECTION

PATENT NO. : 6,886,166 B2
DATED : April 26, 2005
INVENTOR(S) : Roy B. Harrison et al.

It is certified that error appears in the above-identified patent and that said Letters Patent is hereby corrected as shown below:

<u>Column 14,</u>
Line 10, replace "12. Apparatus according to claim 1" with -- 12. Apparatus according to claim 11 --.

Signed and Sealed this

Third Day of January, 2006

JON W. DUDAS
*Director of the United States Patent and Trademark Office*